May 2, 1967  E. E. LEIBERT  3,316,767
SPECIFIC GRAVITY OR FLOW INDICATOR
Filed Nov. 6, 1964  2 Sheets-Sheet 1
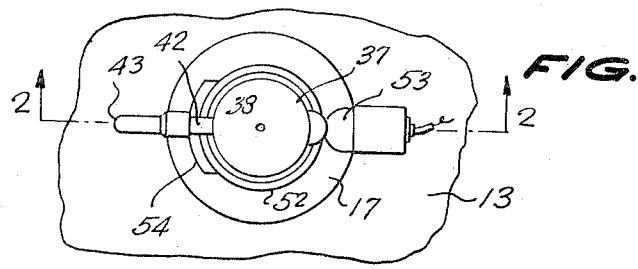
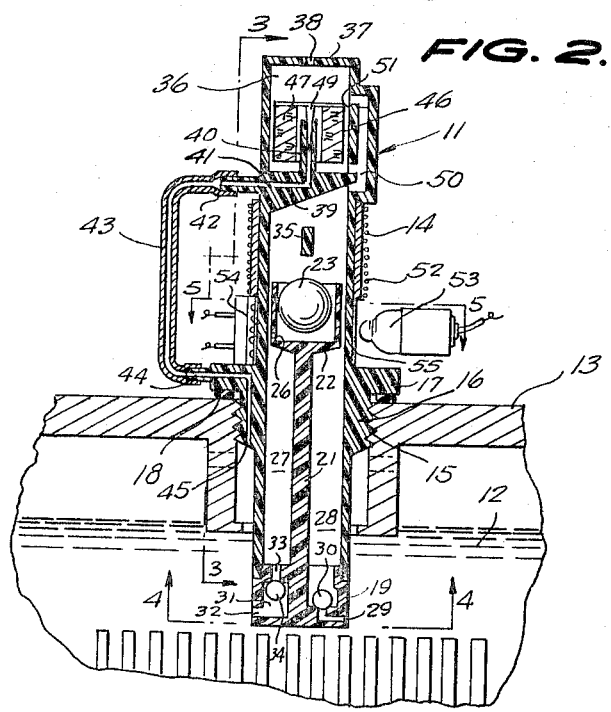
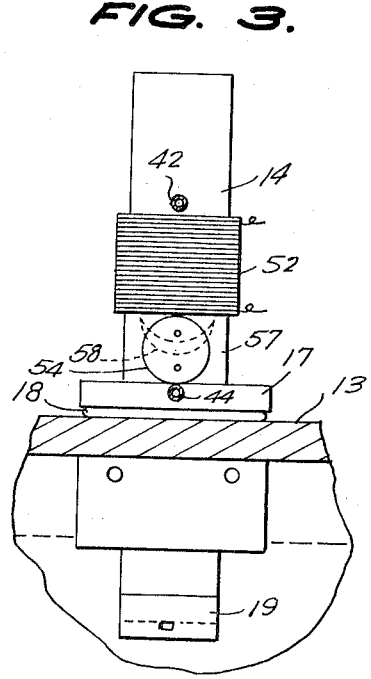
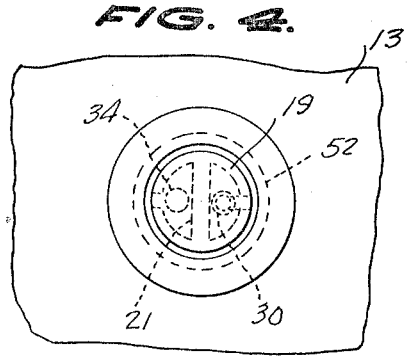
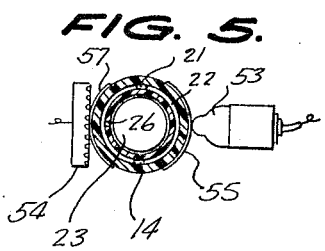
INVENTOR.
EDWARD E. LEIBERT,
BY
Berman, Davidson & Berman
ATTORNEYS.

May 2, 1967    E. E. LEIBERT    3,316,767
SPECIFIC GRAVITY OR FLOW INDICATOR
Filed Nov. 6, 1964    2 Sheets-Sheet 2
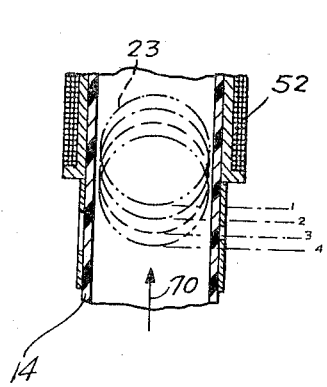
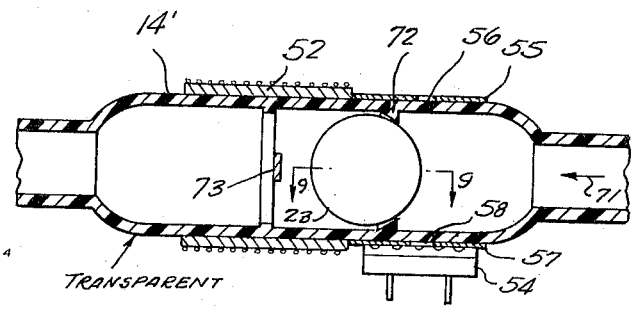
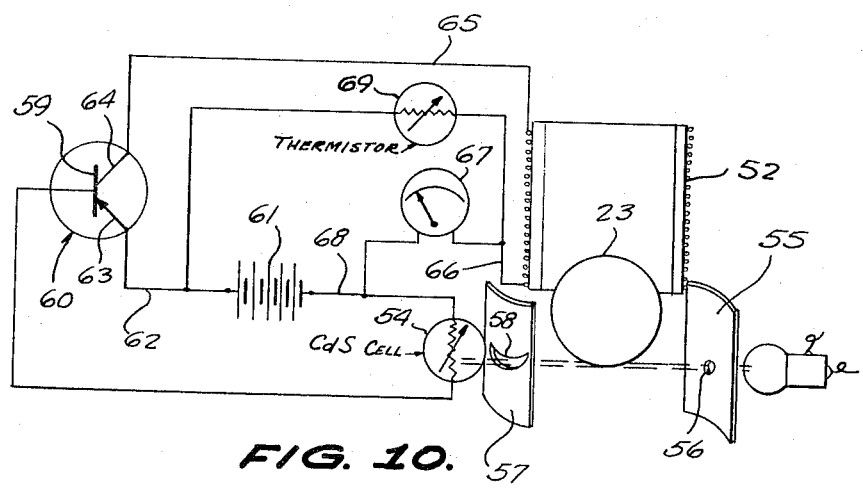
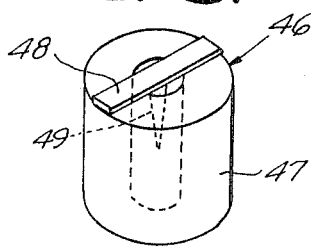
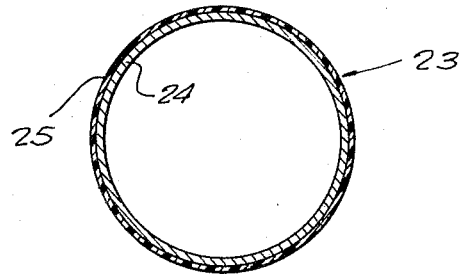
INVENTOR.
EDWARD E. LEIBERT,
BY
Berman, Davidson + Berman
ATTORNEYS.

United States Patent Office 3,316,767
Patented May 2, 1967

3,316,767
SPECIFIC GRAVITY OR FLOW INDICATOR
Edward E. Liebert, Marysville, Wash.
(Rte. 1, Box 40, Okanogan, Wash. 98840)
Filed Nov. 6, 1964, Ser. No. 409,427
11 Claims. (Cl. 73—453)

This invention relates to devices for measuring forces in fluids, and more particularly to an improved apparatus for measuring specific gravity of liquids and fluid flow.

A main object of the invention is to provide a novel and improved apparatus for use in measuring forces in liquids by producing opposing forces by means of an electromagnet and by measuring the value of the current in the electromagnet, whereby to obtain an indication of the force opposed thereby, the device being simple in construction, being reliable in operation, and being protected against changes in ambient conditions, such as temperature, or the like.

A further object of the invention is to provide an improved force measuring instrument which may be employed for measuring fluid flow or specific gravity in liquids, the apparatus being of the type employing an electromagnet to oppose the force being measured, and being provided with means for measuring the current flowing through the electromagnet, as well as means for automatically adjusting the current to the value necessary to oppose the measured force, the apparatus involving inexpensive components, being compact in size, and being durable in construction.

A still further object of the invention is to provide an improved force measuring instrument for measuring the specific gravity of fluids or for measuring the flow of fluids, the device employing an electromagnet for opposing the force being measured and being provided with a meter to measure the current through the electromagnet, the device being further provided with means for automatically sensing changes in value of the forces being measured and for suitably compensating for such changes, so as to always produce an adequate opposing force and to provide a current reading in accordance with said opposing force, the device having high sensitivity, being provided with means for compensating for changes in ambient temperature, and being arranged to provide adequate circulation of fluid therethrough to insure minimum error due to non-homogeneity of the fluid.

Further objects and advantages of the invention will become apparent from the following description and claims, and from the accompanying drawings, wherein:

FIGURE 1 is a top plan view of a force-measuring device according to the present invention, employed in conjunction with a storage battery to measure the specific gravity of the electrolyte of the battery.

FIGURE 2 is a vertical cross sectional view taken substantially on the line 2—2 of FIGURE 1.

FIGURE 3 is a vertical cross sectional view taken substantially on the line 3—3 of FIGURE 2.

FIGURE 4 is a bottom plan view of the device taken substantially on the line 4—4 of FIGURE 2.

FIGURE 5 is a horizontal cross sectional view taken substantially on the line 5—5 of FIGURE 2.

FIGURE 6 is a fragmentary longitudinal vertical cross sectional view taken through a conduit provided with a simplified form of force-measuring device according to the present invention, employed as a flow-measuring means.

FIGURE 7 is a longitudinal vertical cross sectional view taken through a modified form of flow-measuring apparatus constructed in accordance with the present invention.

FIGURE 8 is an enlarged perspective view of the float member employed in the specific gravity-measuring apparatus of FIGURES 1 to 5.

FIGURE 9 is an enlarged cross sectional view taken substantially on the line 9—9 of FIGURE 7.

FIGURE 10 is a schematic diagram showing the electrical connections of a force-measuring circuit forming part of the fluid force-measuring apparatus of the present invention.

Referring to the drawings, and more particularly to FIGURES 1 to 5, 8 and 10, 11 generally designates a force-measuring device according to the present invention arranged to measure the specific gravity of the electrolyte 12 of a conventional chargeable storage battery 13. The device 11 comprises a generally tubular vertical main body 14 of suitable molded insulating material, such as molded plastic, or the like, said main body being formed at an intermediate portion thereof with the enlarged collar section 15 having external screw threads 16 which are threadedly engageable in the internally threaded conventional vent plug aperture of the storage battery 13. The enlarged portion 15 is further provided with a top flange 17 which is sealingly and clampingly engageable on an annular sealing gasket 18 of resilient deformable material, such as rubber, or the like, which surrounds the member 15 and which is positioned below flange 17, as is clearly shown in FIGURE 2.

Threadedly engaged in the bottom end of the tubular body 14, and normally submerged in the electrolyte 12, is a plug member 19 formed integrally with the vertical diametral partition plate 21 extending upwardly for a substantial height within the body 14 and being integrally formed at its top end with a generally cylindrical cup 22 in which is loosely positioned the hollow magnetic ball 23. The magnetic ball 23 is similar in construction to that shown in FIGURE 9, comprising a hollow spherical body portion 24 of magnetic material such as soft iron, or the like, covered with an outer coating 25 of thin plastic material or the like.

The cup 22 is provided at the lower end portion of its cylindrical wall with a small drain aperture 26 which allows electrolyte collecting in the cup 22 to drain downwardly into the space 27 defined on one side of the diametral partition wall 21. The vertical edges of the partition member 21 make substantially sealing contact with the inside surface of the tubular body 14, but the cup 22 is substantially smaller in diameter than the inside diameter of member 14 so as to allow free flow of liquid downwardly between the cup 22 and the inside surface of body 14.

The partition wall member 21 defines a second space 28 in the portion of tubular body 14 opposite the first-mentioned space 27.

Plug 19 is formed with a fluid intake passage 29 whose top end is normally covered by a valve ball 30, said valve ball being of a material having a specific gravity somewhat greater than the maximum specific gravity of the battery electrolyte 12, namely, the maximum specific gravity of the electrolyte which can be obtained under fully charged conditions of the battery. Thus, the ball 30 tends to seat on the top rim of the intake aperture 29 under all conditions of the electrolyte 12, but can be momentarily unseated by the action of gas bubbles formed in the electrolyte and passing through the passage 29 under charging conditions, whereby electrolyte and bubbles can enter the space 28.

The opposite side of plug 19 is formed with an outlet chamber 31 having a discharge passage 32 and having an inlet passage 33. As shown in FIGURE 2, the passage 33 leads into the space 27 and the outlet passage 32 discharges into the battery cell containing the electrolyte 12. A valve ball 34 is provided in the chamber 31, said valve ball 34 being of a relatively light material, namely, of a material having a specific gravity less than the minimum specific gravity of the electrolyte 12, namely, less than the specific gravity of said electrolyte when the battery 13 is completely discharged. Therefore, the ball 34 will tend to seat against the rim of the aperture 33, as shown in FIGURE 2, and will normally tend to seal off the liquid thereabove in the space 27, but which will yield responsive to the building up of a predetermined height of liquid in the tube 14 and which will open to allow some liquid to pass downwardly into the chamber 31 and discharge into the battery cell through the passage 32. The valve balls 30 and 34 thus act to provide a pumping action wherein the electrolyte rises in space 28 during charging of the battery, passes upwardly around the cup 22, descends through the space 27, passing both through the cup 22 and along the exterior thereof, then passing downwardly through the space 27 and through the passage 33 and chamber 31 back into the battery through the discharge passage 32 with an intermittent action, the pumping action assuring that there is adequate circulation of the electrolyte so that the electrolyte around the ball 23 and that in the battery cell have substantially the same specific gravity.

Rigidly secured in the tube 14 above the ball 23 and spaced a short distance above the top rim of the cup 22 is a cross bar 35 which serves as a stop means to limit the upward vertical movement of the ball 23 in a manner presently to be described. The top end of the tube 14 comprises a chamber 36 having a top wall 37 formed with a central vent aperture 38 and provided with a relatively thick bottom wall 39. The bottom wall 39 is formed with the upstanding tubular central conduit element 40 which communicates with a passage 41 leading to a laterally extending conduit element 42 which is connected by a tube 43 with a conduit 44 communicating with a gas discharge passage 45 formed in the enlarged intermediate plug member 15 of the tube 14. Disposed in the chamber 36 is a generally cylindrical float member 46 which comprises a generally cylindrical hollow main body 47 of buoyant material having a top bar 48 secured diametrally across its top end, said top bar 48 being provided with a depending conical valve element 49 which engages in the bore of the upstanding conduit element 40, as shown in FIGURE 2.

The interior of the lower portion of tubular member 14 communicates with the upper space 36 therein through a vertical passage 50 provided in the upper portion of body 14, so that liquid can be forced into the upper chamber 36 to a predetermined level therein, determined by the buoyancy of the float body 47, said level being shown in FIGURE 2 at 51. This level is such that valve element 49 is below the level of the liquid, and the liquid helps to maintain a gas-tight seal during periods of non-charging without the necessity of providing a precisely machined needle and seat. When this predetermined level is reached, the valve element 49 lifts sufficiently out of the upstanding conduit member 40 to allow gas to escape through conduit 40, passage 41, conduit 43 and passage 45 from the interior of the battery cell.

The structure thus far described provides a means for maintaining a predetermined volume of electrolyte in the tubular body 14 during charging of the battery 13, said volume being sufficient to completely immerse the ball 23 and to exert buoyant force thereon, the fluid around the ball 23 being maintained in circulation by the means above described, so that it is substantially of the same specific gravity as the remaining electrolyte of the battery. As above explained, the liquid enters the tubular body 14 along with bubbles generated therein by the release of gas caused by charging or discharging the battery. This gas provides the necessary internal pressure to force the electrolyte to a level sufficient to lift float 47. At the time float 47 lifts sufficiently to allow gas to escape, the liquid level begins to decrease. Due to the difference in mass, the gas can escape at a faster rate than the electrolyte can fall, so that a state of equilibrium is never reached. This causes gas to be released in bursts and causes a continuous rising and falling action of the electrolyte. It is this rising and falling action, along with the action of the ball valves, which maintains a continuous mixing of the electrolyte to assure that the specific gravity of the liquid around the ball 23 is the same as that in the battery cell below. This pumping action is highest during high charge or discharge rates and very low during idle periods. The purpose of cup 22 besides loosely confining ball 23 is to prevent the up and down movement of the liquid from exerting a force on ball 23. Hole 26 is large enough to allow circulation of electrolyte but small enough so that the force developed by this circulation is not sufficient to cause errors of any magnitude.

Due to buoyancy of the magnetic ball 23 it tends to rise in the tube 14 toward the limiting stop member 35. The tendency of the ball 23 to rise is opposed by providing an opposing magnetic field in the interior of the tube 14 adjacent the magnetic ball 23, said field being provided by a coil 52 which is mounted on and which surrounds the portion of the tubular body 14 adjacent and immediately above the ball cup 22.

The cup 22 is made of transparent material, and a beam of light from a lamp 53 is allowed to pass through the cup toward a photo cell 54 in a manner presently to be described, the photo cell 54 being arranged in a circuit which responds to changes in height of the magnetic ball 23 in a manner to control the current in the coil 52 so that the current is always sufficient to produce a magnetic field of sufficient strength to oppose the buoyant force exerted on the magnetic ball 23. Thus, the tube 14, which is of transparent material, such as transparent plastic material, or the like, is provided on the side portion thereof adjacent to the lamp 53 with an opaque arcuate masking plate 55 having an aperture 56 allowing light to pass therethrough from the lamp 53 and through the wall of the tubular body 14. Mounted on the tubular body 14 diametrically opposite the plate 55 is an arcuate opaque masking plate 57 formed with a crescent-shaped exit aperture 58 diametrically aligned with the entrance aperture 56, so as to define a light beam path between lamp 53 and photo cell 54. The magnetic ball 23 is disposed in this light beam path and controls the amount of light impinging on the photo cell 54.

The photo cell 54 is of the resistance type, namely, is of a type whose resistance varies in accordance with the intensity of the light impinging thereon. For example, cell 54 may be of cadmium sulphate type. As shown in FIGURE 10, the photo cell 54 is connected in a manner to control the bias applied to the base 59 of a transistor 60. Thus, a battery 61 has its negative terminal connected to the base 59 through the photo cell 54. The positive terminal of the battery is connected by a wire 62 to the emitter 63 of the transistor 60, and the collector 64 of the transistor is connected by a wire 65 to one terminal of the coil 52. The opposite terminal of coil 52 is connected by a wire 66 through an ammeter 67 to the negative battery wire 68. The circuit of FIGURE 10 will stabilize so that sufficient current flows in the coil 52 to provide a magnetic force sufficient to oppose the buoyant force acting on the magnetic ball 23, since the ball is arranged to regulate the amount of light impinging on the photo cell 54. Assuming a rise in the specific gravity of the electrolyte 12, there will be an increase in buoyant force acting upwardly on the ball 23, which tends to elevate the ball. This allows more light to pass through the gating aperture 58, causing a corresponding change in resistance of the cell 54. This change of resistance correspondingly changes the bias on the base 59 which acts to increase the flow of current in the coil 52, thereby producing an increased opposing magnetic force on the ball 23, which ultimately holds the ball in a position corresponding to the increase in specific gravity of the battery electrolyte. The increase in current is indicated on the meter 67, which thus provides an indication of the increased specific gravity of the electrolyte.

Obviously, the meter 67 may be calibrated directly in specific gravity units so that it will give a direct reading of the specific gravity of the electrolyte 12 at all times.

The circuit is compensated for ambient temperature variations by the provision of a compensating thermistor 69 which is connected between wire 66 and wire 62 in the manner illustrated in FIGURE 10, so that it acts as a variable shunt tending to divert current from the coil 52 responsive to changes in ambient temperature. Without the thermistor 69, a substantial change in ambient temperature could introduce a serious error in the reading of the ammeter 67. The provision of the shunting thermistor 69, connected as shown in FIGURE 10, provides the necessary temperature compensation to minimize such errors.

As above stated, when the specific gravity of the electrolyte 12 increases, the buoyant force acting upwardly on the ball 23 increases and said ball tends to rise. This increases the amount of light impinging on the photo cell 54, which thus decreases in resistance and thereby increases the value of the negative potential applied to the base 59. The transistor 60 therefore responds by increasing the current flow in the collector wire 65 and accordingly, the current supply to the coil 52. The magnetic force generated by the coil 52 is thus increased to oppose the increased buoyant force acting on the ball 23 until a condition of stable equilibrium is obtained. The resultant current is read by the meter 67, which may, as above mentioned, be calibrated in specific gravity values.

The crescent-shaped exit aperture 58 provides a relatively sharp change in the resistance of photo cell 54 responsive to vertical movement of the valve ball 23, thus providing improved sensitivity. The provision of the opaque masking plates 55 and 57 also serve to prevent interference from extraneous light sources by excluding such sources from the photo cell 54.

It will be noted that the vertical cup 22 loosely receives the magnetic ball 23 so that it acts as a vertical guide means for said magnetic ball but is sufficiently large in internal diameter to provide ample clearance around the ball 23 to allow free circulation of liquid downwardly through the cup.

The buoyant force acting on the ball 23 is opposed by the magnetic force developed by the coil 52 in the embodiment of FIGURES 1 to 5, 8 and 10, wherein the specific gravity changes in the electrolyte 12 produce the changes in buoyant force acting on the ball 23. Thus, as the battery becomes charged, the specific gravity of the electrolyte 12 increases, and this is shown continuously on the meter 67, so that the condition of the battery can be observed at any time. Referring to FIGURE 6, it will be seen that if the ball 23 is immersed in a fluid of given specific gravity or density of a value such that the ball is buoyant therein, and a relatively large current is passed through the coil 52, the ball will assume the lowermost dotted view position thereof shown in FIGURE 6, and designated at "4." If the current is decreased in successive steps, the ball will move upwardly into the coil in corresponding steps, such as the dotted view positions illustrated in FIGURE 6 and designated at "3" and "2," finally assuming the full line position thereof shown in FIGURE 6, and designated at "1," which corresponds to the condition wherein the lowest current flows in the coil 52. If the current is decreased below this last-named value, the ball 23 will float on up through coil 52. Thus, in the embodiment illustrated in FIGURES 1 to 5, the coil 52 acts to pull the ball down and to hold it substantially at the lower end of the coil 52. This permits operation with the ball so located that about half of it is actually inside the coil 52, which is a condition providing maximum holding power with minimum current required in the coil 52, while still making it feasible to position the light source 53 and the photo cell 54 subjacent the coil 52 and allows for a relatively compact unit, which is highly desirable and necessary when it is to be employed in place of the normal vent plug of a storage battery, as above described. This arrangement also makes it practical to use the photo cell in a transistorized circuit such as that shown in FIGURE 10 employing a photo cell of the cadmium sulphate type providing a decreasing resistance with an increase in light intensity impinging thereto, used to control the bias potential on the base 59 of a transistor 60, whereby to correspondingly control the collector current from the transistor passing through the coil 52, as above described.

The simplified arrangement illustrated in FIGURE 6 is also adapted for use as a simple flow meter, using the circuit of FIGURE 10 and the light source 53 and photo cell 60, as above described. Thus, if liquid is flowing through the tube 14 in the direction indicated by the arrow 70 in FIGURE 6, the liquid will impose a force on the ball 23 tending to move the ball along with the liquid. This force can be balanced by magnetic force developed in the coil 52, acting to restrain movement of the ball in the same manner as the rise in specific gravity of the electrolyte 12 is opposed by the force of the coil 52 in the previously described form of the invention. Thus, the rate of flow of the fluid through the tube 14 will be measured by the ammeter 67 since the force required to hold the ball 23 in the lower end portion of the coil, as in FIGURE 6, will vary with the rate of flow of the fluid through the tube. Obviously, the size of the ball 23 in FIGURE 6 is somewhat exaggerated, since the ball may be made smaller than that illustrated so as not to interfere too severely with the flow of the fluid.

FIGURE 7 illustrates a further modification of the arangement of FIGURE 6 wherein the main body of the flow-measuring device is designated at 14' and is arranged horizontally, and the fluid passes through the body 14' in the direction of the arrow 71. The body 14' is provided internally with an annular inwardly projecting seat 72 against which the ball 23 may engage, being urged toward the seat 72 by magnetic force developed in the coil 52, said magnetic force opposing the force exerted on the ball 23 by the fluid moving in the direction of the arrow 71. Movement of the ball 23 leftward, as viewed in FIGURE 7, through the coil 52 is limited by the provision of a transversely projecting stop lug or bar 73 against which the ball 23 may engage when the holding force exerted by the coil 52 is insufficient to oppose the force imposed by the moving fluid on the ball. Using the same circuit as in FIGURE 10, the ball 23 will stabilize at a position wherein the holding force exerted thereon by coil 52 balances the force of the liquid acting on the ball, whereby the meter 67 will provide a reading corresponding to the rate of fluid flow.

It will therefore be apparent that the device shown in FIGURE 7 may be readily adapted for use in measuring the rate of flow of light fluids, either in liquid or gaseous form. In accordance with the usual practice, the device of FIGURE 7 may be connected between spaced points along a main conduit carrying moving fluid so that a portion of the moving fluid is fed into the body portion 14' of the flow-measuring device, the sampled portion of the fluid passing through the flow-measuring device at a rate corresponding to the rate of flow of fluid in the main conduit. This arrangement therefore does not substantially interfere with the flow of the fluid through the main conduit, while allowing the rate of flow thereof to be measured by diverting a relatively small amount of the fluid therefrom between the aforesaid points spaced along the main conduit. With the arrangement of FIGURE 7, the photo cell 54 operates in the same manner as described previously in connection with the embodiment of FIGURES 1 to 5, to receive varying intensities of light in accordance with the changes in position of the ball 23, thereby varying the collector current through the transistor 60, and thereby varying the magnetic force exerted by the coil 52 on the ball 23, until a condition of stable equilibrium is obtained wherein the ball 23 is held stationary. The current flow under this condition, shown on the meter 67, will be in accordance with the rate of flow of the fluid through the main body 14' of the flow-measuring device.

While certain specific embodiments of force-measuring devices for fluids have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a force-measuring device of the character described, a conduit member, a magnetic member movably disposed in said conduit member, fluid in said conduit member exerting force on said magnetic member, a coil wound on said conduit member, a source of current, a photo cell on one side of the conduit member, a light source on the other side of the conduit member, means providing a light-transmitting path between said light source and photo cell, said magnetic member being at least partly in said path, whereby to vary the amount of light impinging on the photo cell in accordance with movements of the magnetic member relative to said coil, a masking plate mounted between said conduit member and said photo cell and having a light-transmitting aperture in said light-transmitting path, said aperture being of varying width in the direction of movement of said movement of said magnetic member in said conduit member, whereby to correspondingly vary the sensitivity of response of said photo cell, a source of current, current control means, means operatively connecting said photo cell to said current control means, circuit means connecting said source to said coil through said current control means, whereby to produce a flow of current through the coil which stabilizes at a value sufficient to provide a magnetic force on the magnetic member balancing the fluid force acting thereon, and means to measure said current.

2. In a force-measuring device of the character described, a transparent conduit member, a hollow magnetic member movably disposed in said conduit member, fluid in said conduit member exerting force on said magnetic member and at least partially receiving said magnetic member, a source of current, a photo cell on one side of the conduit member, a light source on the other side of the conduit member mounted in a position to project light toward said photo cell, said magnetic member being at least partly in the path of travel of the light, whereby to vary the amount of light impinging on the photo cell in accordance with movement of the magnetic member relative to said coil, a masking plate mounted between said conduit member and said photo cell and having a light-transmitting aperture in said light-transmitting path, said aperture being of varying width in the direction of movement of said magnetic member in said conduit member, whereby to correspondingly vary the sensitivity of response of said photo cell, a source of current, current control means, means operatively connecting said photo cell to said current control means, circuit means connecting said source to said coil through said current control means, whereby to produce a flow current through the coil which stabilizes at a value sufficient to provide a magnetic force on the magnetic member balancing the fluid force acting thereon, and means to measure said current.

3. In a force-measuring device of the character described, a conduit member, a magnetic member movably disposed in said conduit member, fluid in said conduit member exerting force on said magnetic member, a coil wound on said conduit member, a source of current, a photo cell on one side of the conduit member, a light source on the other side of the conduit member, means providing a light-transmitting path between said light source and photo cell, said magnetic member being at least partly in said path, whereby to vary the amount of light impinging on the photo cell in accordance with movements of the magnetic member relative to said coil, a source of current, a transistor, circuit means connecting said source between the emitter and base of the transistor through said photo cell, whereby to vary the potential on the base in accordance with the variations in the light impinging on the photo cell, means connecting said coil in circuit with the collector and emitter of said transistor and with said source, whereby the current in the coil varies with the base potential, and whereby a flow of current is produced through the coil which stabilizes at a value sufficient to provide a magnetic force on the magnetic member balancing the fluid force acting thereon, and means to measure said current.

4. In a force-measuring device of the character described, a conduit member, a magnetic member movably disposed in said conduit member, fluid in said conduit member exerting force on said magnetic member, a coil wound on said conduit member, a source of current, a photo cell on one side of the conduit member, said photo cell being of the type whose resistance varies responsive to variations in the amount of light received thereby, a light source on the other side of the conduit member, means providing a light-transmitting path between said light source and photo cell, said magnetic member being at least partly in said path, whereby to vary the amount of light impinging on the photo cell in accordance with movements of the magnetic member relative to said coil, a source of current, a transistor, circuit means connecting said source between the emitter and base of the transistor through said photo cell, whereby to vary the potential on the base in accordance with the variations in the light impinging on the photo cell, means connecting said coil in circuit with the collector and emitter of said transistor and with said source, whereby the current in the coil varies with the base potential, and whereby a flow of current is produced through the coil which stabilizes at a value sufficient to provide a magnetic force on the magnetic member balancing the fluid force acting thereon, and means to measure said current.

5. In a force-measuring device of the character described, a conduit member, a magnetic member movably disposed in said conduit member, fluid in said conduit member exerting force on said magnetic member, a coil wound on said conduit member, a source of current, a photo cell on one side of the conduit member, a light source on the other side of the conduit member, said conduit member being of transparent material, respective apertured opaque mask members disposed between the light source and the conduit member and between the conduit member and the photo cell, providing a light-transmitting path between the light source and the photo cell, said magnetic member being located so as to be at least in partly obstructing relationship in said light-transmitting path, whereby to vary the amount of light impinging on the photo cell in accordance with movement of the magnetic member relative to said coil, a source of current, a transistor, circuit means connecting said source between the emitter and base of the transistor through said photo cell, whereby to vary the potential on the base in accordance with the variations in the light impinging on the photo cell, means connecting said coil in circuit with the collector and emitter of said transistor and with said source, whereby the current in the coil varies with the base potential, and whereby a flow of current is produced through the coil which stabilizes at a value sufficient to provide a magnetic force on the magnetic member balancing the fluid force acting thereon, and means to measure said current.

6. In a force-measuring device in a body of liquid, a substantially vertical conduit member immersed in the liquid, partition means defining respective inlet and outlet passages in the lower portion of said conduit member, respective ball valves in the lower ends of said passages, said ball valves including movable ball elements of different densities, the outlet passage ball valve seating upwardly and having a specific gravity less than that of the liquid and the inlet ball valve seating downwardly and having a specific gravity greater than that of the liquid, a guide cup at the top end of said partition means, said guide cup having a bottom drain aperture leading to the outlet passage to allow circulation of liquid from the inlet passage to the outlet passage through the guide cup, a magnetic ball member buoyant in said liquid movably disposed in said guide cup and changing its height therein with changes in the specific gravity of the liquid, a coil wound on said conduit member adjacent said guide cup, means to produce a flow of current in said coil to provide a magnetic force on the ball member to oppose upward buoyant force on the ball member, and means to measure said current, whereby to obtain an indication of the specific gravity of the liquid.

7. In a force-measuring device in a body of liquid, a substantially vertical conduit member immersed in the liquid, partition means defining respective inlet and outlet passages in the lower portion of said conduit member, respective ball valves in the lower ends of said passages, said ball valves including movable ball elements of different densities, the outlet passage ball valve seating upwardly and having a specific gravity less than that of the liquid and the inlet ball valve seating downwardly and having a specific gravity greater than that of the liquid, a guide cup at the top end of said partition means, said guide cup having a bottom drain aperture leading to the outlet passage to allow circulation of liquid from the inlet passage to the outlet passage through the guide cup, a magnetic ball member buoyant in said liquid movably disposed in said guide cup and changing its height therein with changes in the specific gravity of the liquid, a coil wound on said conduit member adjacent said guide cup, a source of current, a photo cell on one side of the conduit member, a light source on the other side of the conduit member, means providing a light-transmitting path between said light source and photo cell, said magnetic member being at least partly in said path, whereby to vary the amount of light impinging on the photo cell in accordance with movements of the magnetic member relative to said coil, a source of current, current control means, means operatively connecting said photo cell to said current control means, circuit means connecting said source to said coil through said current control means to produce a flow of current through the coil in a direction to provide a magnetic force on said ball member to oppose upward buoyant force on the ball member, and means to measure said current, whereby to obtain an indication of the specific gravity of the liquid.

8. In a force-measuring device in a body of liquid, a substantially vertical transparent conduit member immersed in the liquid, partition means defining respective inlet and outlet passages in the lower portion of said conduit member, respective ball valves in the lower ends of said passages, said ball valves including movable ball elements of different densities, the outlet passage ball valve seating upwardly and having a specific gravity less than that of the liquid and the inlet ball valve seating downwardly and having a specific gravity greater than that of the liquid, a guide cup at the top end of said partition means, said guide cup having a bottom drain aperture leading to the outlet passage to allow circulation of liquid from the inlet passage to the outlet passage through the guide cup, a magnetic ball member buoyant in said liquid movably disposed in said guide cup and changing its height therein with changes in the specific gravity of the liquid, a coil wound on said conduit member adjacent said guide cup, a source of current, a photo cell on one side of the conduit member, a light source on the other side of the conduit member, said light source being mounted in a position to project light toward said photo cell, said magnetic member being at least partly in the path of travel of the light, whereby to vary the amount of light impinging on the photocell in accordance with movements of the magnetic member relative to said coil, a source of current, current control means, means operatively connecting said photo cell to said current control means, circuit means connecting said source to said coil through said current control means to produce a flow of current through the coil in a direction to provide a magnetic force on said ball member to oppose upward buoyant force on the ball member, and means to measure said current, whereby to obtain an indication of the specific gravity of the liquid.

9. In a force-measuring device in a body of liquid, a substantially vertical conduit member immersed in the liquid, partition means defining respective inlet and outlet passages in the lower portion of said conduit member, respective ball valves in the lower ends of said passages, said ball valves including movable ball elements of different densities, the outlet passage ball valve seating upwardly and having a specific gravity less than that of the liquid and the inlet ball valve seating downwardly and having a specific gravity greater than that of the liquid, a guide cup at the top end of said partition means, said guide cup having a bottom drain aperture leading to the outlet passage to allow circulation of liquid from the inlet passage to the outlet passage through the guide cup, a magnetic ball member buoyant in said liquid movably disposed in said guide cup and changing its height therein with changes in the specific gravity of the liquid, a coil wound on said conduit member adjacent said guide cup, a source of current, a photo cell on one side of the conduit member, a light source on the other side of the conduit member, means providing a light-transmitting path between said light source and photo cell, said magnetic member being at least partly in said path, whereby to vary the amount of light impinging on the photo cell in accordance with movements of the magnetic member relative to said coil, a source of current, a transistor, circuit means connecting said source between the emitter and base of the transistor through said photo cell, whereby to vary the potential on the base in accordance with the variations in the light impinging on the photo cell, means connecting said coil in circuit with the collector and emitter of said transistor and with said source so that current in the coil varies with the base potential, and so that a flow of current is produced through the coil in a direction to provide a magnetic force on said ball member to oppose upward buoyant force on the ball member, and means to measure said current, whereby to obtain an indication of the specific gravity of the liquid.

10. In a force-measuring device in a body of liquid, a substantially vertical conduit member immersed in the liquid, partition means defining respective inlet and outlet passages in the lower portion of said conduit member, respective ball valves in the lower ends of said passages, said ball valves including movable ball elements of different densities, the outlet passage ball valve seating upwardly and having a specific gravity less than that of the liquid and the inlet ball valve seating downwardly and having a specific gravity greater than that of the liquid, a guide cup at the top end of said partition means, said guide cup having a bottom drain aperture leading to the outlet passage to allow circulation of liquid from the inlet passage to the outlet passage through the guide cup, a magnetic ball member buoyant in said liquid movably disposed in said guide cup and changing its height therein with changes in the specific gravity of the liquid, said conduit member being provided at its top portion with a float chamber, a float return conduit connected to said float chamber, a float valve member engaged in the top end of said return conduit and opening in response to a predetermined liquid level in said float chamber, a coil wound on said conduit member adjacent said guide cup, means to produce a flow of current in said coil to provide a magnetic force on the ball member, in a direction to provide a magnetic force on said ball member to oppose upward buoyant force on the ball member, and means to measure said current, whereby to obtain an indication of the specific gravity of the liquid.

11. In a force-measuring device in a body of liquid, a substantially vertical conduit member immersed in the liquid, partition means defining respective inlet and outlet passages in the lower portion of said conduit member, respective ball valves in the lower ends of said passages, said ball valves including movable ball elements of different densities, the outlet passage ball valve seating upwardly and having a specific gravity less than that of the liquid and the inlet ball valve seating downwardly and having a specific gravity greater than that of the liquid, a guide cup at the top end of said partition means, said guide cup having a bottom drain aperture leading to the outlet passage to allow circulation of liquid from the inlet passage to the outlet passage through the guide cup, a magnetic ball member buoyant in said liquid movably disposed in said guide cup, and changing its height therein with changes in the specific gravity of the liquid, said conduit member being provided at its top portion with a float chamber, a fluid return conduit connected to said float chamber, a float valve member engaged in the top end of said return conduit and opening in response to a predetermined liquid level in said float chamber, a source of current, a photo cell on one side of the conduit member, a light source on the other side of the conduit member, means providing a light-transmitting path between said light source and photo cell, said magnetic ball member being at least partly in said path, whereby to vary the amount of light impinging on the photo cell in accordance with movement of the magnetic ball member relative to said coil, a source of current, current control means, means operatively connecting said photo cell to said current control means, circuit means connecting said source to said coil through said current control means so as to produce a flow of current to the coil in a direction to provide a magnetic force on said ball member opposing upward buoyant force on the ball member, and means to measure said current, whereby to obtain an indication of the specific gravity of the liquid.

References Cited by the Examiner
UNITED STATES PATENTS

| | | | |
|---|---|---|---|
| 2,090,715 | 8/1937 | Powell et al. | 73—432 |
| 2,503,091 | 4/1950 | Brooke et al. | 73—209 |
| 2,543,522 | 2/1951 | Cohen | 73—452 |
| 3,104,549 | 9/1963 | Humbert et al. | 73—228 |
| 3,154,950 | 11/1964 | Hargens et al. | 73—453 |

RICHARD C. QUEISSER, *Primary Examiner.*

JAMES J. GILL, J. D. SCHNEIDER,
*Assistant Examiners.*